(12) United States Patent
Brach

(10) Patent No.: US 6,878,051 B2
(45) Date of Patent: Apr. 12, 2005

(54) SAW BLADE WITH SHAPED GULLETS

(75) Inventor: Kurt Brach, Rodpau (DE)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 10/358,520

(22) Filed: Feb. 5, 2003

(65) Prior Publication Data

US 2004/0149114 A1 Aug. 5, 2004

(51) Int. Cl.[7] ............................................. B23F 21/03
(52) U.S. Cl. ...................................... 451/542; 451/547
(58) Field of Search ................................. 451/540, 541, 451/542, 546, 547, 548; 125/12, 15

(56) References Cited

U.S. PATENT DOCUMENTS

| | | | |
|---|---|---|---|
| 3,064,399 A | 11/1962 | Anderson | |
| 3,162,187 A | 12/1964 | Christensen | |
| 4,345,579 A | * 8/1982 | Eichenlaub et al. | .......... 125/15 |
| 4,462,382 A | 7/1984 | Baron et al. | |
| 4,516,560 A | * 5/1985 | Cruickshank et al. | ......... 125/15 |
| 4,550,708 A | * 11/1985 | Roemmele et al. | ........... 125/15 |
| 4,583,515 A | 4/1986 | Ballenger | |
| 4,705,017 A | 11/1987 | Lewis | |
| 4,854,295 A | 8/1989 | Sakarcan | |
| 4,860,722 A | * 8/1989 | Veglio | .......................... 125/15 |
| 5,311,705 A | 5/1994 | Zuzelo | |
| 5,392,759 A | * 2/1995 | Kwang | ......................... 125/15 |
| 5,441,033 A | 8/1995 | Chiuminatta et al. | |
| 5,471,970 A | 12/1995 | Sakarcan | |
| 5,507,273 A | * 4/1996 | Chiuminatta et al. | ..... 125/13.01 |
| 5,518,443 A | * 5/1996 | Fisher | ......................... 451/540 |
| 6,287,184 B1 | 9/2001 | Carpentier et al. | |
| 6,321,738 B1 | 11/2001 | Walsh | |
| D458,948 S | 6/2002 | Chianese et al. | |
| D459,375 S | 6/2002 | Chianese et al. | |
| D459,376 S | 6/2002 | Chianese et al. | |
| D459,740 S | 7/2002 | Chianese et al. | |
| 6,599,177 B2 | 7/2003 | Nevoret et al. | |
| 2002/0123302 A1 | 9/2002 | Maras et al. | |

FOREIGN PATENT DOCUMENTS

| | | |
|---|---|---|
| DE | 4424203 | 1/1996 |
| DE | 10020681 | 11/2001 |
| EP | 0027675 | 4/1981 |
| GB | 2207626 | 2/1989 |
| KR | 8601969 | 11/1986 |
| WO | WO9511794 | 5/1995 |
| WO | WO/0043179 | 7/2000 |

* cited by examiner

Primary Examiner—Dung Van Nguyen
(74) Attorney, Agent, or Firm—Mary E. Porter; Sampson & Associates, PC

(57) ABSTRACT

A tool such as a circular diamond abrasive saw blade includes a circular metallic body having a substantially central aperture through which the saw blade is mountable to a rotatable drive shaft, and a plurality of cutters disposed in spaced relation along a periphery of said body. A plurality of gullets are located in spaced relation between the cutters, extending radially inward from the periphery. The gullets are sized and shaped in the form of alphanumeric or graphical indicia.

26 Claims, 5 Drawing Sheets

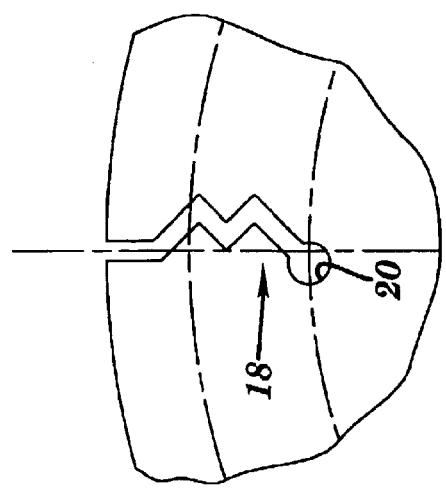
FIG. 1B
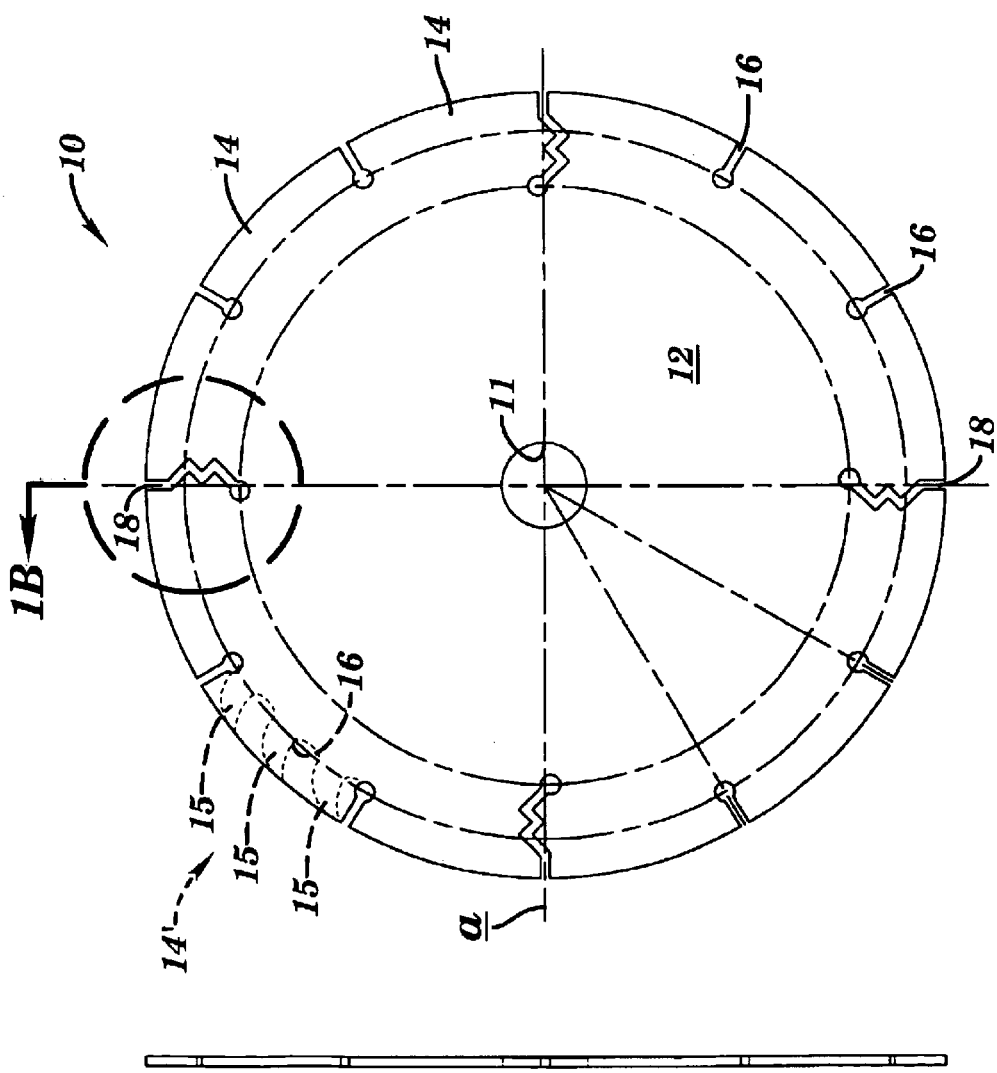
FIG. 1A
FIG. 2

SAW BLADE WITH SHAPED GULLETS

BACKGROUND

1. Field of the Invention

This invention relates to the field of material removing tools, and in particular, to saw blades having gullets spaced along the periphery thereof, the gullets being sized and shaped to form indicia corresponding to an aspect of the tool.

2. Background Information

Common material removal tools include cutting and abrasive tools such as saw blades, abrasive saw blades, and core drill bits, which are widely used on conventional power saws and grinding machines. These tools are often circular, and configured for being centrally mounted on a machine spindle for operational rotation thereabout. Other such tools, such as band saw blades and the like, are configured for being driven around a pair of pulleys. All of these tools tend to be configured for uni-directional material-removing movement relative to a workpiece.

Such tools have often been provided with peripheral gullets or gullet-like indentations (i.e., voids) to provide functions such as debris (e.g., swarf) removal, cooling, and stress relief, during operation. Gullets/voids have also been used in grinding and sanding wheels to provide visual access to the workpiece during operation, such as disclosed in U.S. patent application Ser. No.: 09/796,941 to Conley, et al., filed on Mar. 2, 2001, entitled Abrasive Wheels With Workpiece Vision Feature.

The uni-directional nature of many of these tools generally necessitates proper installation on the machine. The requisite directional orientation is often not easily apparent to casual or even experienced users by a simple visual inspection of the tool itself. For this reason, the proper directional orientation of the tool is often printed, painted, or otherwise marked directly on the tool, to facilitate proper installation. Additional markings, including trademark, trade dress, or other source of origin elements, are also often affixed directly to the tool in a similar manner. Disadvantageously however, such indicia is often worn away or otherwise removed during tool operation, to complicate the proper identification of orientation and/or source of origin of the tool. This may lead to improper re-installation in the event the tool is removed from the machine, and may lead to fewer re-orders due to a failure to properly identify the source of origin of the tool.

Thus, a need exists for an improved cutting/abrasive tool that addresses the aforementioned drawbacks.

SUMMARY

One aspect of the present invention includes a circular diamond abrasive saw blade including a circular metallic body having a substantially central aperture through which the saw blade is mountable to a rotatable drive shaft. A series of cutters are located in spaced relation along a periphery of the body, and a series of gullets are located in spaced relation between the cutters. The gullets extend radially inward from the periphery of the body, and are sized and shaped in the form of indicia. The indicia may include letters, numbers, graphic shapes, and/or combinations thereof.

Another aspect of the present invention includes a tool configured for being driven in a longitudinal direction to remove material from a workpiece. The tool includes a body, mountable to a drive mechanism, and a series of cutters located in spaced relation along a periphery of the body. At least one gullet is located between the cutters, the gullet extending inwardly from the periphery. The gullet is sized and shaped to form indicia, such as in the form of letters, numbers, graphic shapes, and/or combinations thereof.

A further aspect of the invention includes a method for labeling a metallic core diamond abrasive cutting tool. The method includes cutting a series of symbols, such as letters, numbers, graphic shapes, and combinations thereof, from the metallic core to visually label the tool and provide stress relief along a perimeter of the metallic core during operation of the tool.

In yet another aspect of the invention, a method is provided for fabricating a circular abrasive cutting tool having permanent indicia thereon. The method includes providing a substantially circular body having a central aperture through which the body is mountable to a rotatable drive shaft, and providing cutters along a periphery of the body. The method also includes locating at least one gullet on the body, extending from the periphery towards the aperture, and configuring the gullet(s) in the form of indicia selected from the group consisting of alphanumeric and design symbols.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 1A is a plan view of one embodiment of a material removal tool of the present invention, with optional aspects thereof shown in phantom;

FIG. 1B is a plan view, on an enlarged scale, of a portion of the material removal tool of FIG. 1A;

FIG. 2 is an elevational view of the material removal tool of FIG. 1A;

DETAILED DESCRIPTION

Figure 3:
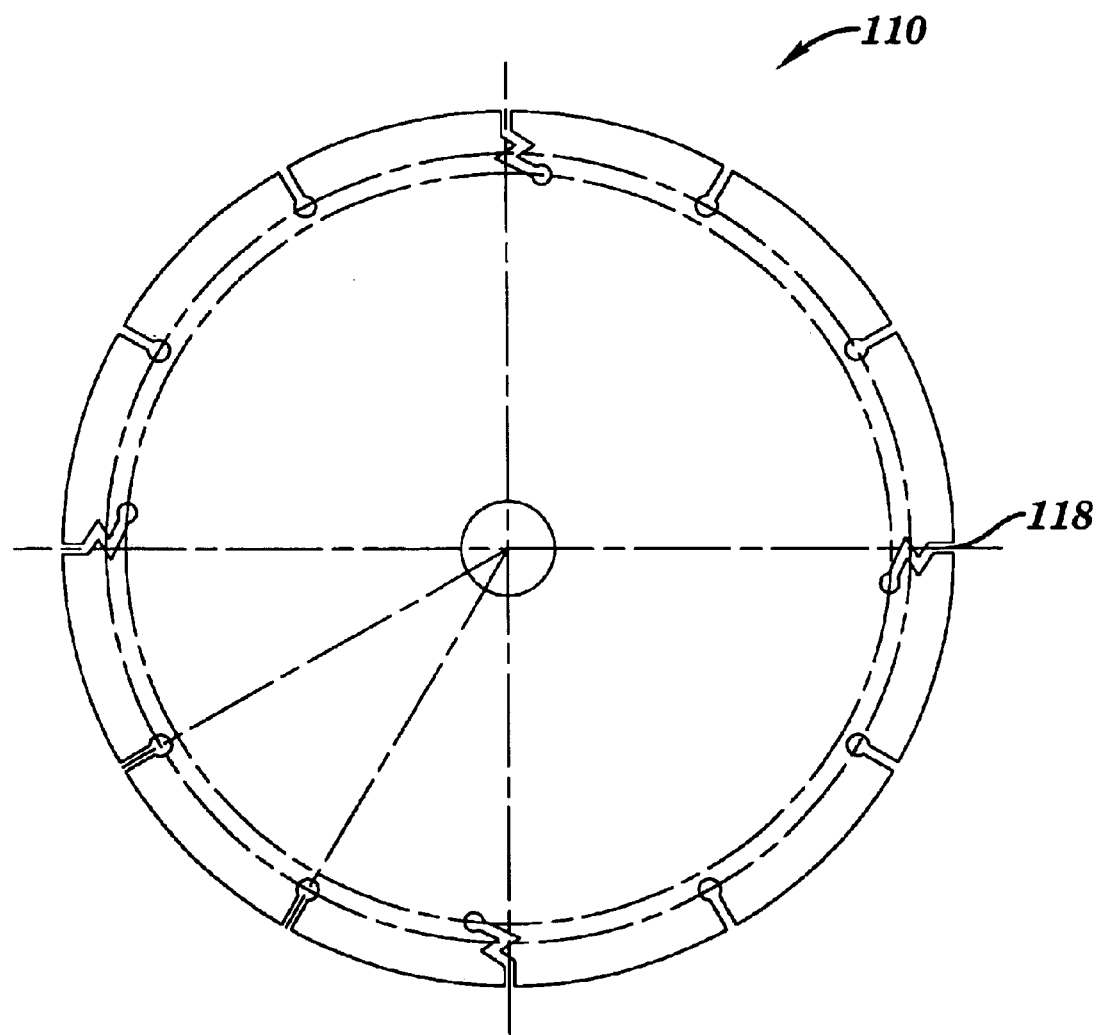
FIG. 3 is a plan view of an alternate embodiment of a material removal tool of the present invention.

Referring to the figures set forth in the accompanying drawings, the illustrative embodiments of the present invention will be described in detail hereinbelow. For clarity of exposition, like features shown in the accompanying drawings shall be indicated with like reference numerals and similar features as shown in alternate embodiments in the drawings shall be indicated with similar reference numerals.

Embodiments of the present invention include metallic core diamond abrasive cutting tools, e.g., saw blades of the type commonly used to cut masonry, having gullets configured as alphanumeric, and/or graphical, indicia. These gullets are typically cut into the metallic core, but may be provided using any suitable metal fabrication process or technique. The gullets may be configured to provide source of origin information (e.g., trademark or service mark indicia), safety information, or a combination thereof. For example, the gullets may be configured with letters and/or symbols that represent a tool seller's name or trademark, and/or which are assymetrical, so as to be legible when the tool is installed in the proper (e.g., rotational) orientation on a particular piece of equipment (e.g., power saw).

Embodiments of the invention thus offer the combined functions of providing indicia that will not wear off or become similarly compromised during use, while simultaneously providing stress relief along the perimeter of the metallic core.

Where used in this disclosure, the term "axial" when used in connection with a tool (e.g., saw blade) described herein, shall refer to a direction relative to the tool, which is substantially parallel to its center of rotation a (FIGS. 1A and 2) during operation. The "longitudinal" and/or "cutting" direction of a tool refers to the direction of material-removing movement of the tool relative to a workpiece. For example, in the event the tool is circular, the longitudinal/cutting direction is orthogonal to the axial direction. The "face" of a tool is a surface thereof, which extends in the cutting direction.

Referring now to the figures, various embodiments of the present invention are described. Turning to FIGS. 1A–2, an embodiment of the present invention includes a cutting tool, such as a masonry circular saw blade 10. Blade 10 includes a metallic core 12, having a central hole or aperture 11 through which the blade 10 may be mounted and fastened to the spindle of a circular saw (not shown) in a conventional manner, e.g., with a threaded fastener. As shown, the core 12 is substantially circular in shape, and may comprise substantially any material having a sufficient specific strength, and desirably, a density of, about 2.0 to about 8.0 g/cm$^3$. Examples of suitable materials are steel, aluminum, titanium, bronze, their composites and alloys, and combinations thereof. Reinforced plastics having sufficient specific strength may also be used to construct the core. Generally desirable metallic core materials include ANSI 4140 steel and aluminum alloys, 2024, 6065 and 7178.

A plurality of cutters 14 is disposed in spaced relation along the periphery of the core, between a series of gullets 16, 18. As shown, cutters 14 may include abrasive segments of the type used on conventional abrasive saw blades. These segments include abrasive grain brazed or otherwise secured to the surface of core 12. Substantially any conventional abrasives may be used, such as, but not limited to, alumina in fused, sintered, and/or sol gel form, silica, silicon carbide, zirconia-alumina, fused or sintered alloys of alumina with at least one ceramic oxide selected from the group consisting of $M_gO$, $C_oO$, $TiO_2$, $V_2O_3Cr_2O_3$, ceria, boron suboxide, garnet, and emory. Superabrasive grains may also be used, including but not limited to diamond and cubic boron nitride (CBN), with or without a metal coating.

Moreover, as an optional variation, blade 10 may be provided with cutters 14' which include a series of teeth 15, as shown in phantom in FIG. 1A. Teeth 15 may be of nominally any size and shape commonly used on saw blades, e.g., to cut relatively soft materials such as wood, plastic, and the like. As a further variation, teeth 15 may be provided with conventional hardened tips (not shown), such as fabricated from tungsten carbide.

As shown, the gullets 16, 18 extend radially inward from the periphery of core 12, preferably terminating at a radiused (e.g., substantially circular) surface 20 (FIG. 1B). The skilled artisan will recognize that radiused surface 20 advantageously helps to attenuate stresses that may otherwise tend to generate stress fractures in the core at the base of the gullet.

The gullets may be configured in the form of substantially any desired indicia, including alphanumeric characters and/or various design elements. For example, in the embodiment shown in FIGS. 1A and 1B, gullets 18 are configured to form the letter "W".

As also shown, every gullet 16, 18, need not be configured as indicia. Rather, the indicia-configured gullets 18 may be interspersed among conventional gullets 16 as shown. This interspersed arrangement may be particularly useful in embodiments that employ cutters 14', each of which have a relatively large number of teeth 15 and gullets 16, as described hereinabove.

Gullets 18 are typically cut into the core using conventional cutting or milling processes. However, the gullets may be provided using any suitable fabrication process, including molding, stamping, or laser cutting.

Figure 5:
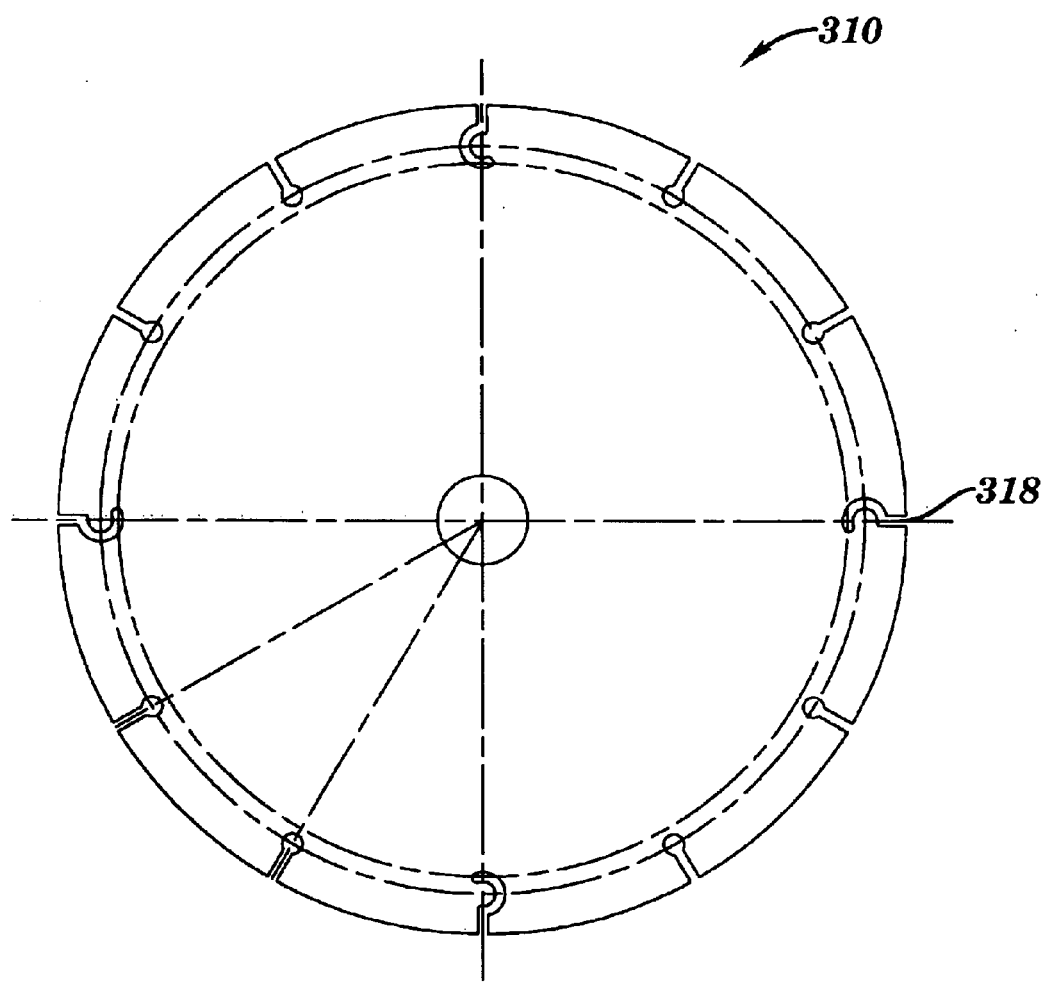
Figure 6:
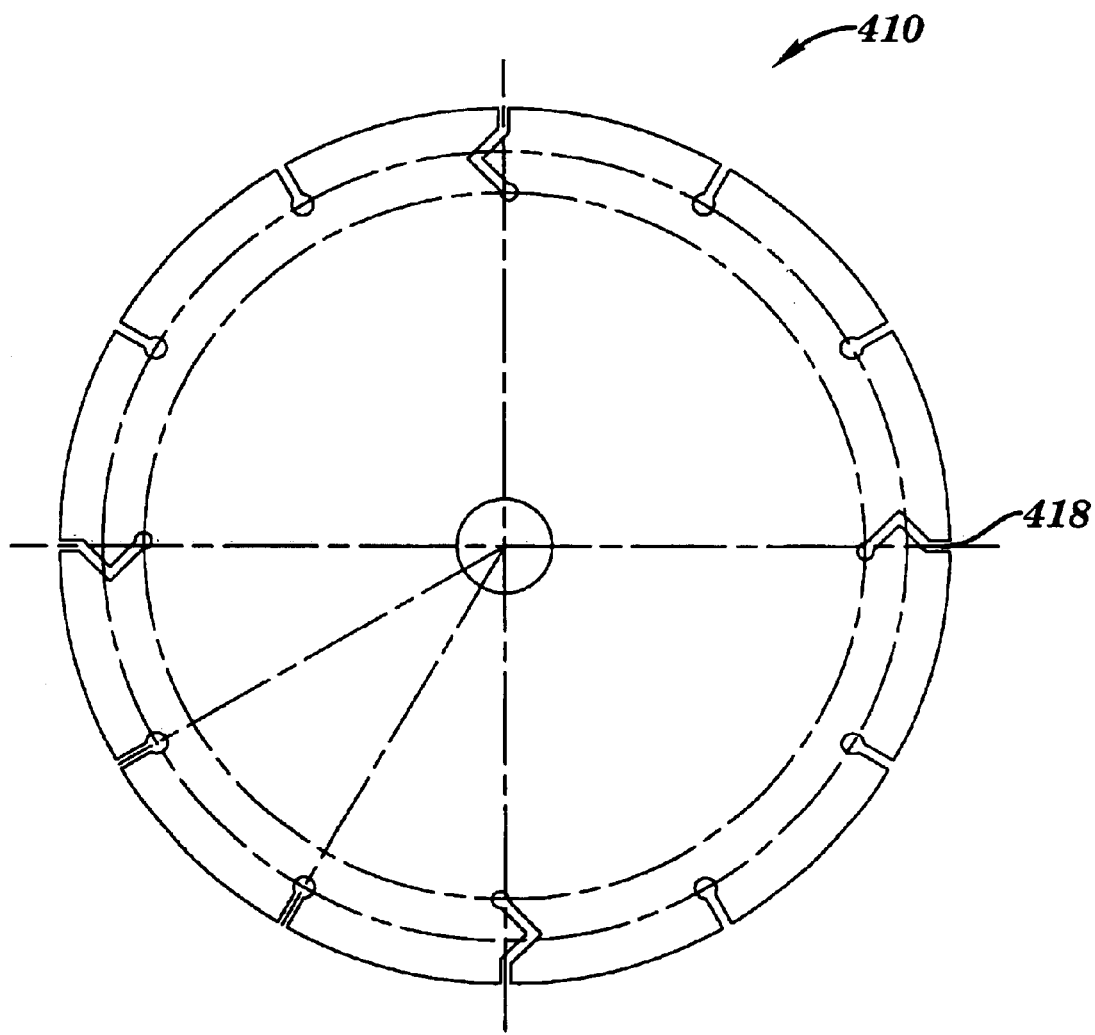

Turning to FIGS. 3, 5, and 6, alternate embodiments of wheel 10 are shown as wheels 110, 310, 410, having gullets 118, 318, 418, which are shaped as the letters, "N", "C", and "V", respectively. Although these figures depict wheels that each have gullets of the same letter, individual wheels may be provided with substantially any combination of alphanumeric, or other, symbols. A single wheel may thus be provided with gullets configured as various letters, to enable acronyms, abbreviations, or words to be formed. In this manner, tools 10, 110, etc., may be customized for particular purchasers.

Figure 4:
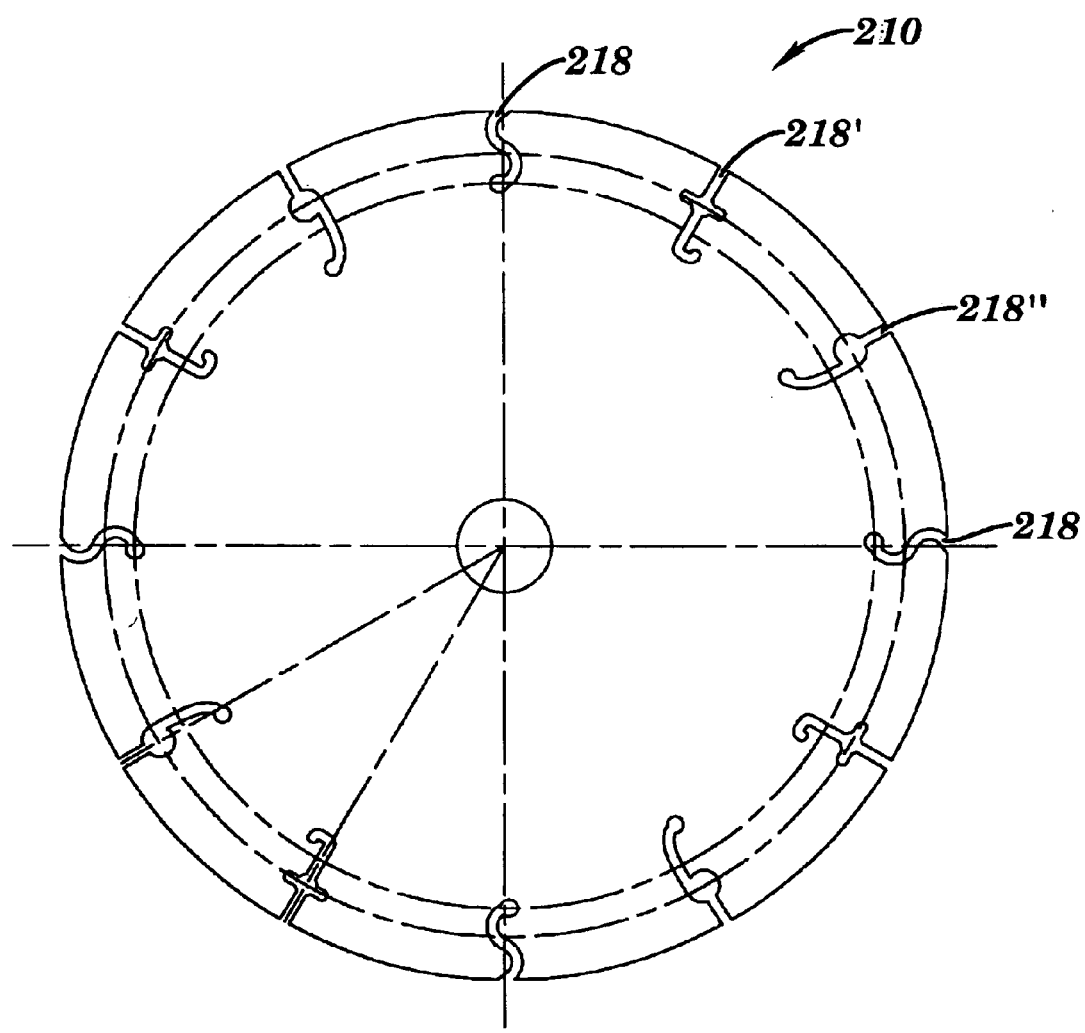
FIGS. 4–6 are views similar to that of FIG. 3, of still other embodiments of the material removal tool of the present invention.

For example, turning now to FIG. 4, a tool 210 manufactured by "Saint-Gobain Abrasives, Inc." may be customized with a repeating pattern of "s", "t" and "g" shaped gullets 218, 218', 218". In addition to alphanumeric indicia, the gullets may be configured in the form of a corporate logo. (An example of a corporate logo that may be suitable for such use is the NIKE® SWOOSH® logo, Nike Corporation, Beaverton Oreg.). This embodiment thus provides a non-removable trademark/indication of source of origin, which may serve as a convenient means for maintaining brand identity among their customers.

This embodiment also provides a convenient means for 'brand-labeling' the tools for re-sale, such as by configuring the gullets with indicia associated with the customer/reseller. In this manner, the reseller may be provided with a customized tool line for sale to its end-user customers. This approach, including the nominally permanent marking, may encourage greater brand loyalty by their customers.

Also, as discussed hereinabove, while the gullets 18, 118, etc., combine identification with the functional aspects of stress relief and debris/swarf removal, another potential functional aspect of these embodiments is increased safety. Since the alphanumeric indicia is cut into the core, extending completely through the axial dimension thereof, these indicia will be properly viewable and/or legible, (i.e., upright and legible from left to right at the top of the blade as shown in FIG. 4) from one face of the blade, while the mirror image (i.e., upright, but backwards at the top of the blade) would be seen from the other face (e.g., in the event the blade were installed incorrectly). As mentioned hereinabove, many saw blades are uni-directional, i.e., they are designed to cut in a single direction through a workpiece. The skilled artisan will recognize that such uni-directionality is typically a function of asymmetries in the configuration of the segments 14, such as generated by the orientation of individual abrasive grains and/or cutting teeth thereon. As such, operation of such blades in the reverse direction may result in inefficient cutting performance and/or reduced safety. To address these concerns, embodiments of the present invention may be fabricated so that the alphanumeric indicia are properly viewable from the threaded-fastener-side of a particular power saw, such as shown in FIG. 4, when properly installed. These embodiments thus provide an easily discernable visual indication of whether or not the blade 18, 118, etc., is properly installed. Moreover, since this directional information is provided independently of conventional painted or otherwise applied markings on the face of the core 12, the quality of such visual indication will not rub off, smudge, or otherwise degrade during use.

Although the present invention has been described with respect to circular saw blades, the skilled artisan will recognize that substantially any type of cutting or grinding tool of the type having gullets, may be used, without departing from the spirit and scope of the invention. For example, otherwise conventional band saw blades may be provided with the gullet configurations disclosed herein. In addition, non-abrasive circular saw blades of the type commonly used to cut wood, plastic, and other relatively soft materials may incorporate the gullets described herein. Moreover, although the tools described herein are cutting tools or abrasive cutting tools, the skilled artisan should recognize that gullets configured as described hereinabove, may be applied to other types of material removal tools, such as conventional steel core, segmented diamond abrasive wheels, without departing from the spirit and scope of the present invention.

In addition, although the embodiments described herein disclose gullets shaped as indicia, such indicia may be placed elsewhere on the tool, such as inward of the tool's periphery, without departing from the spirit and scope of the invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A circular diamond abrasive saw blade comprising:
   a circular metallic body having a substantially central aperture through which the saw blade is mountable to a rotatable drive shaft;
   a plurality of cutters disposed in spaced relation along a periphery of said body;
   a plurality of gullets disposed in spaced relation between said cutters;
   said gullets extending radially inward from the periphery of said body; and
   said gullets being configured in the form of indicia selected from the group consisting of letters, numbers, trademarks, and combinations thereof.

2. A tool configured for being driven in a longitudinal direction to remove material from a workpiece, said tool comprising:
   a body, mountable to a drive mechanism;
   a plurality of cutters disposed in spaced relation along a periphery of said body;
   at least one gullet disposed between said cutters;
   said gullet extending inwardly from said periphery; and
   said gullet being configured to form indicia selected from the group consisting of letters, numbers, trademarks, and combinations thereof.

3. The tool of claim 2, comprising a rotary material removal tool configured for operational rotation about a central axis.

4. The tool of claim 2, being configured for operations selected from the group consisting of cutting, abrading, and combinations thereof.

5. The tool of claim 4, comprising a saw blade.

6. The tool of claim 5, wherein said cutters comprise a plurality of teeth.

7. The tool of claim 5, comprising an abrasive saw blade.

8. The tool of claim 7, wherein said cutters comprise abrasive grain disposed on said periphery.

9. The tool of claim 8, wherein said abrasive grain is selected from the group consisting of: alumina; silica; silicon carbide; zirconia-alumina; alloys of alumina having at least one ceramic oxide selected from the group consisting of $M_gO$, $C_oO$, $TiO_2$, $V_2O_3Cr_2O_3$; ceria; boron suboxide; garnet; emory; diamond; cubic boron nitride (CBN); and combinations thereof.

10. The tool of claim 2, wherein the drive mechanism includes a drive shaft.

11. The tool of claim 2, comprising a plurality of gullets interspersed among said cutters.

12. The tool of claim 2, wherein said body is metallic.

13. The tool of claim 2, wherein said gullet is configured to relieve stress in said core during operation of said tool.

14. The tool of claim 2, wherein said gullet is configured to facilitate debris removal.

15. A method for labeling a metallic core diamond abrasive cutting tool, said method comprising cutting a plurality of symbols, selected from the group consisting of letters, numbers, trademarks, and combinations thereof, from the metallic core to visually label the tool and provide stress relief along a perimeter of the metallic core during operation of the tool.

16. A method of fabricating a circular abrasive cutting tool having permanent indicia disposed thereon, said method comprising:
   (a) providing a substantially circular body having a substantially central aperture through which the body is mountable to a rotatable drive shaft;
   (b) disposing cutters along a periphery of the body;
   (c) disposing at least one gullet on the body, extending from the periphery towards the aperture;
   (d) configuring the gullet(s) in the form of indicia selected from the group consisting of alphanumeric symbols and trademarks.

17. The method of claim 16, wherein said disposing (b) comprises disposing abrasive segments along the periphery of the body.

18. The method of claim 17, wherein said disposing (b) comprises disposing abrasive grain on the periphery of the body.

19. The method of claim 16, wherein said disposing (c) comprises disposing a plurality of gullets on the body.

20. The method of claim 19, wherein said configuring (d) comprises configuring the gullets with indicia representing a source of origin of the tool.

21. The method of claim 19, wherein said configuring (d) comprises configuring and orienting the indicia to provide visual indication of a preferred direction of operation of the tool.

22. The method of claim 21, wherein the direction of operation comprises a rotational direction.

23. A method of brand-labeling a circular abrasive cutting tool, comprising the method of claim 16, wherein said configuring (d) further comprises configuring the gullet as indicia associated with a seller of the tool.

24. The method of claim 23, comprising configuring the gullet as indicia associated with a re-seller of the tool.

25. A method for enhancing the safety of a metallic core diamond abrasive cutting tool, said method comprising the method of claim 16, and further comprising configuring the gullet(s) to provide visual indication that the tool is properly installed in a cutting apparatus for rotation in a preferred direction during operation thereof.

26. The method of claim 16, comprising configuring the gullet(s) to simultaneously relieve mechanical stress and indicate a source of origin of the tool.

* * * * *